United States Patent [19]

Bretherick et al.

[11] 4,140,424
[45] Feb. 20, 1979

[54] BARRIER FOR OIL SPILT ON WATER

[75] Inventors: Leslie Bretherick, Ascot; Denis H. Desty, Weybridge; Michael G. Webb, Wootton Bridge, all of England

[73] Assignee: The British Petroleum Company Limited, London, England

[21] Appl. No.: 638,745

[22] Filed: Dec. 8, 1975

Related U.S. Application Data

[63] Continuation of Ser. No. 523,144, Nov. 12, 1974, abandoned, which is a continuation of Ser. No. 262,680, Jun. 14, 1972, abandoned.

[30] Foreign Application Priority Data

Jun. 12, 1971 [GB] United Kingdom ............... 28931/71

[51] Int. Cl.² ............................................. E02B 15/04
[52] U.S. Cl. ........................................ 405/68; 405/26
[58] Field of Search .................. 61/1 F, 5; 210/242, 210/DIG. 21

[56] References Cited

U.S. PATENT DOCUMENTS

| | | | |
|---|---|---|---|
| 3,476,246 | 11/1969 | Dahan | 61/1 F X |
| 3,503,508 | 3/1970 | Desty et al. | 61/5 X |
| 3,567,019 | 3/1971 | Headrick | 61/1 F X |
| 3,613,377 | 10/1971 | Zaugg | 61/1 F |
| 3,662,891 | 5/1972 | Headrick | 61/1 F X |
| 3,703,811 | 11/1972 | Smith | 61/1 F |

Primary Examiner—Mervin Stein
Assistant Examiner—David H. Corbin
Attorney, Agent, or Firm—Morgan, Finnegan, Pine, Foley & Lee

[57] ABSTRACT

An inflatable barrier for oil spilt on water consists of an air chamber and a water chamber which when inflated give a figure-of-eight cross-section, and in order to facilitate laying there is a pilot air tube attached to the air chamber preferably 1/500 the cross-sectional area of the air chamber. The pilot air tube is quickly inflated and prevents sinking or twisting of the barrier prior to inflation of the air and water chambers.

8 Claims, 3 Drawing Figures

BARRIER FOR OIL SPILT ON WATER

This is a continuation of application Ser. No. 523,144 filed Nov. 12, 1974, now abandoned, which is a continuation of application Ser. No. 262,680, filed June 14, 1972, now abandoned.

This invention relates to a barrier to oil split on water.

U.K. Pat. No. 1,188,156 relates to a barrier to oil split on water which comprises one or more air chambers and one or more water chambers all the walls of all said chambers being formed of flexible material, the chambers being so positioned that when the air chambers have been inflated with air and the water chambers have been inflated with water the barrier will float with part below and part above the water surface so as to impede the passage of floating oil.

It has been found that when laying out a barrier as described in U.K. Pat. No. 1,188,156 prior to inflation, the barrier is liable to twisting and kinking especially in rough water, and if the density of the material the boom is made of is greater than that of the water the boom can sink before inflation. This twisting, kinking and sinking can adversely affect speedy and effective inflation of the boom.

We have now discovered a modified barrier structure which reduces this difficulty.

According to the invention there is provided an inflatable barrier for oil split on water which comprises at least two air chambers one of which is a pilot air tube and has a cross-sectional area when inflated of less than a twentieth of that of the combined cross-sectional area of the other air chambers when inflated, and one or more water chambers; the walls of all of said chambers being formed of flexible material, the chambers being so positioned that when the air chambers have been inflated with air, the water chambers have been inflated with water and the barrier placed in water the barrier will float with part below and part above the water surface so as to impede the passage of floating oil.

The cross-sectional areas are measured when the chambers are substantially fully inflated to avoid distortions and deformation to the chambers.

The chambers are preferably substantially circular in cross-section when fully inflated.

Suitable flexible material includes (natural or synthetic) rubberised fabric, e.g. neoprene coated nylon.

In this specification the verb "to inflate" is used to designate the admittance of both air and water, as appropriate, and in both cases it implies the right quantity to confer the desired mechanical properties on the inflated barrier. (During inflation a little water may be introduced into an air chamber or a little air into a water chamber. This "contamination" must be maintained at a sufficiently low level to avoid undesirable reduction in the efficacy of the barrier. If necessary this contamination could be reduced by incorporating suitable interconnections with non-return valves between the air and water chambers).

After inflation with air and water the barrier has sufficient flexibility to follow wave motion although it is sufficiently resistant to twisting to enable it to maintain the water chambers below, and the air chambers above, the surface of the water.

We have found that the barrier behaves particularly well when the under-water portion has neutral buoyancy. It will be apparent that the mass of the flexible material from which the barrier is constructed will be small compared with the mass of the water contained in the barrier after inflation and therefore, for all practical purposes, the neutral buoyancy conditions will be achieved provided that no massive elements, e.g. heavy metal chains, are incorporated in the structure.

In some applications the barrier may be subjected to stretching forces which act along the length of the barrier and these may be high enough to cause a risk of damage. In such applications one or more ropes, tapes or wires may be incorporated into the structure of the barrier so as to take the strain of these forces.

Preferably each air chamber and water chamber runs the whole length of the barrier.

The pilot air tube preferably has a cross-sectional area when inflated less than one-eightieth that of the combined cross-sectional are of the inflated other air tube or tubes, more preferably it is less than one-two hundredth, most preferably less than one-three hundredth; especially suitable cross-sectional area ratios are from one-three hundred twentieth to one-seven hundred fiftieth.

In one embodiment of the invention the barrier consists of an air chamber and a water chamber joined together to form a figure-of-eight cross section and the pilot air tube is affixed to the air chamber.

The pilot air tube can be affixed to the air chamber by welding, by an adhesive or it can be formed together with the chamber e.g. by an extrusion.

The pilot air tube can be positioned so that, when the air and water chambers are inflated, it is at the top, bottom or any intermediate position in relation to the air chamber; preferably it is positioned so as to be at the top of the chamber i.e. at the side of air chamber remote from the water chamber after inflation of the air chamber.

In a preferred embodiment of the invention the pilot air tube has ribs on its inside positioned so that when the pilot air tube is uninflated there is still a continuous air passage therethrough. Thus no bonding or kinking can form a block in the air passage.

Since all the barriers according to the invention are constructed from flexible material they can be rolled up and packed into a relatively small space for transport and storage. Constructions which collapse to a flat configuration are particularly suitable for rolling up.

When the barrier is to be formed on a water surface the uninflated boom is layed out, and as it is layed out the small air chamber (hereinafter referred to as the pilot air tube) is inflated. The pilot air tube gives sufficient bouyancy and rigidity to the barrier structure to cause the barrier to remain substantially untwisted and unkinked. When the barrier is fully layed out the main air and water chambers are then inflated. Alternatively the pilot air tube can be inflated before the barrier is layed out.

Air inflation is conveniently achieved by means of an air pump powered by compressed gas, e.g. air entrainment devices such as ejectors and Coanda nozzles, (which is an air entrainment device described in British Patent No. 829,065 and in an article published in "Scientific American" June 1966 at pages 84–92).

Similarly water inflation may be achieved by gas powered pumps, e.g. diaphragm pumps. Alternatively water inflation may be achieved by means of spring members which open each water chamber so that water enters via non-return inlets.

The invention includes the barriers when deflated for storage and when inflated for use. Air and the water upon which the barrier is to float are convenient for inflation since these are readily available. It is apparent that the air can be replaced by any other gas which is available at a suitable pressure.

The pilot air tube is preferably inflated from a compressed air bottle, and it, as a result of its relatively small volume can be readily and quickly inflated.

A particular suitable form of apparatus for transportation and inflation of the inflatable barrier comprises a floatable container in which is placed the inflatable barrier, which is connected to an inflating means capable of inflating the air and water chambers.

The floatable container can be made of any suitable material such as wood, fibre reinforced plastics material, e.g. glass fibre reinforced polyester resin. The container preferably contains buoyancy sections filled with a solid foam to prevent sinking in case of being holed.

The inflating means for inflating the air and water chambers of the barrier is preferably an internal combustion engine driving a blower for the air chamber or chambers and a marine propeller for the water chambers. Suitable engines are diesel engines modified for use in explosive atmospheres. Preferably there is a clutch whereby the engine can be started and run at low speed without activating the inflating means. The container also preferably contains a fuel tank for the engine to enable the engine to run for long periods without supervision or attention. The barrier is preferably laid flat in the container in a zig-zag fashion with one end connected to the inflating means. One end of the boom is preferably connected to a sea drogue. Preferably the barrier engine and fuel tank are all contained in the container and a lid fitted over the container to provide a sealed capsule. The container preferably is readily transportable by road, air or ship in order to be transported speedily to the place of the spillage, and preferably contains towing means attached to one end to enable the container to be readily towed by ordinary boats or ships containing normal equipment, e.g. harbour launches.

The container can be used to deploy booms at spillages occuring at sea, at terminals, harbours or entrances, and also at spillages occurring at drilling rigs at sea.

In operation at a spillage at sea, the container is placed in position near the spillage, a sea-drogue affixed to one end of the barrier (if not already affixed) and the sea-drogue dropped in the sea. The container is towed away from the drogue, preferably downwind, and when the barrier is fully laid either whilst inflating the pilot air tube or immediately before inflating the pilot air tube, and then the inflating means started up and the other air and water chambers of the boom inflated.

The invention will now be described with reference to the accompanying drawings in which:-

Figure 1:
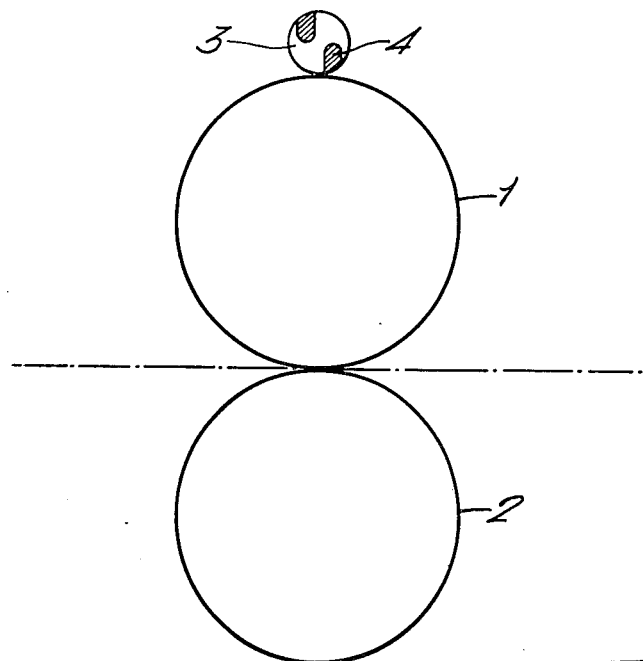
FIG. 1 is a cross-sectional view of the barrier when inflated on a water surface.

An air chamber 1 is joined along a continuous weld 5 to water chamber 2 to form a figure-of-eight cross-section. Attached to air chamber 1 is a pilot air tube 3 having ribs 4 on its inside, when inflated the cross-sectional area of the pilot air tube 3 (is a one-five hundredth of the air chamber 1. The chambers are made from rubberised nylon.

Figure 2:
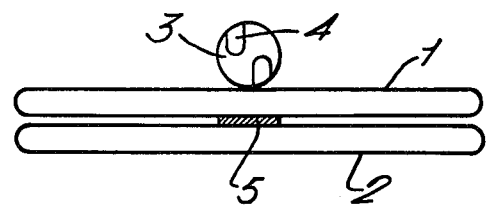
FIG. 2 is a view of the barrier when uninflated.

Referring to FIG. 2 when the barrier is to be laid, pilot air tube 3 is inflated, the ribs 4 ensuring there is an air passage throughout its length. The barrier is laid on the water and pilot air tube 3 has sufficient buoyancy and strength to hold the boom in position and to prevent it sinking or twisting. When the barrier is in the water, chambers 1 and 2 are inflated by air and water respectively till the configuration shown in FIG. 1 is attained.

Figure 3:
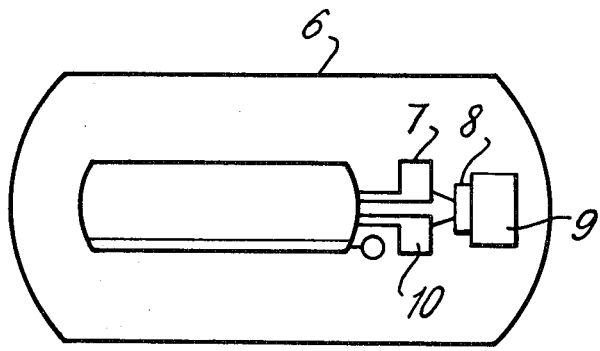
FIG. 3 is a plan view of a container containing the uninflated barrier for transportation and deployment.

Referring to FIG. 3 the barrier is laid on the floor of the container 6, zig-zag folded. The container 6 is basically a Cathedral hull make of a glass fibre reinforced polyester resin partly filled with a solid foam.

The main air chamber is connected to blower 7 driven via centrifugal clutch 8, by diesel engine 9, the pilot air tube is connected to air cylinder 11. The water chamber is connected to water pump 10 consisting of a marine propeller fitted on an outdrive unit, the propeller is driven by engine 9 via clutch 8. There is a diesel engine fuel tank (not shown) fitted amidships of the container with sufficient fuel to give the engine an operational life of several days.

The container is designed to be towed using a nylon towing warp.

Attached to the other end of the boom from the inflating means is a drogue which is carried on the towing vessel.

In operation the container is towed to the spillage and the drogue is launched from the towing vessel and the container is towed downwind away from the drogue. The load on the drogue pulls the barrier end out of the container and triggers off an air cylinder to inflate the pilot air tube, preventing the barrier from sinking during laying.

As the last turn of the barrier leaves the container the throttle on the engine 9 is pulled full open and the centrifugal clutch 8, transmits drive to the air and water pumps 7 and 10 and inflation commences. The engine 9 runs continuously till it is cut off or the fuel supply runs out. Should the engine stop then one-way valves prevent deflation. Pressure reliefs are also provided to prevent over inflation.

There can also be present on the boom a dynamo driven by the engine or a battery to power a visual and/or radio beacon.

We claim:

1. An inflatable barrier for oil spilt on water to be deployed from a floatable container, comprising:
    an elongate air chamber, a pilot air tube fixed along the length of said air chamber in side by side relationship and having a cross-sectional area when inflated of less than about one twentieth of the cross-sectional area of the air chamber when inflated, a compressed air source coupled to said pilot air tube for quickly inflating the entire length of said pilot air tube during or prior to deployment of the barrier, an elongate water chamber joined to said air chamber in side by side relationship, the walls of said chambers and said pilot air tube being formed of flexible material, air inflating means for inflating said air chamber with air, and water inflating means for inflating said water chamber with water, said inflated pilot air tube preventing twisting, kinking, and sinking of the barrier during deployment at sea prior to activation of said air inflating means and said water inflating means, said inflated air chamber and said inflated water chamber coacting to establish a floatation level in the water with a portion of said barrier above and a portion below the surface of the water, so that said inflated air chamber impedes the passage of floating oil.

2. An inflatable barrier as claimed in claim 1, wherein: said air chamber and said water chamber are joined together in side by side relationship along said jointure line to form a barrier having a figure eight cross section.

3. An inflatable barrier as claimed in claim 1, wherein: said air and water chambers extend substantially along the entire length of the barrier.

4. An inflatable barrier as claimed in claim 3, wherein: said pilot air tube extends continuously along the entire length of said air chamber.

5. An inflatable barrier as claimed in claim 4, wherein: said compressed air source for quickly inflating said pilot air tube is a bottle containing compressed air, said air inflating means for said air chamber is a blower driven by an engine, and said water inflating means for said water chamber is a marine propeller driven by said engine.

6. An inflatable barrier as claimed in claim 1, which is laid flat in a zig-zag fashion in the floatable container prior to deployment in the water, wherein:
said compressed air source is a compressed air bottle;
said air inflating means includes a blower driven by an internal combustion engine;
said water inflating means includes a marine propeller driven by said internal combustion engine; and
the floatable container includes a fuel tank for said internal combustion engine.

7. An inflatable barrier as claimed in claim 1, wherein: the cross-sectional area of said pilot air tube when inflated is less than about one eightieth that of said air chamber when inflated.

8. A method of deploying an inflatable barrier for oil spilt on water which barrier includes an elongate air chamber, a pilot air tube fixed along the length of the said air chamber in side by side relationship and having a cross-sectional area when inflated of less than about one twentieth the cross-sectional area of the air chamber when inflated, an elongate water chamber joined to the air chamber in side by side relationship, the walls of the chambers and the pilot air tube being formed of flexible material, including the steps of:

(a) inflating the pilot air tube before or during the laying of the uninflated air and water chambers of the barrier on the surface of the water to prevent twisting, kinking, and sinking of the uninflated air chambers;

(b) inflating the elongate air chamber with air and the water chamber with water; and (c) maintaining inflation pressures in the air and water chambers so that the barrier floats and the inflated air chamber impedes the passage of floating oil.

* * * * *